Jan. 31, 1933.  A. C. WILLIAMS  1,896,035
ELECTRIC BRAKE MECHANISM
Filed Feb. 16, 1932   4 Sheets-Sheet 2
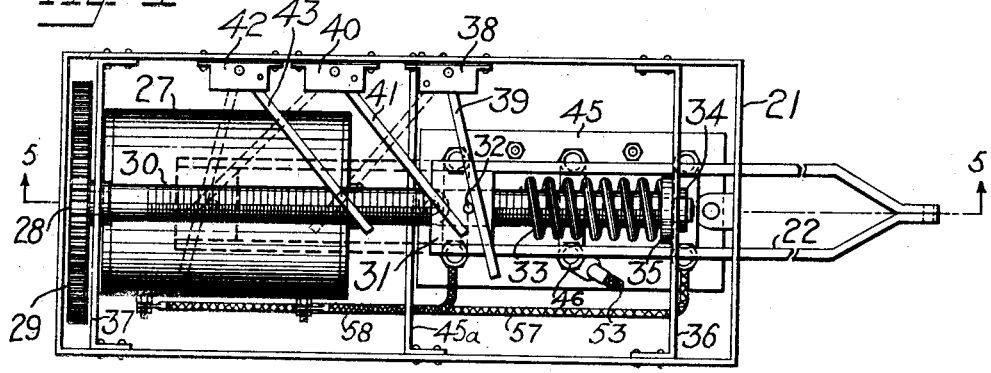
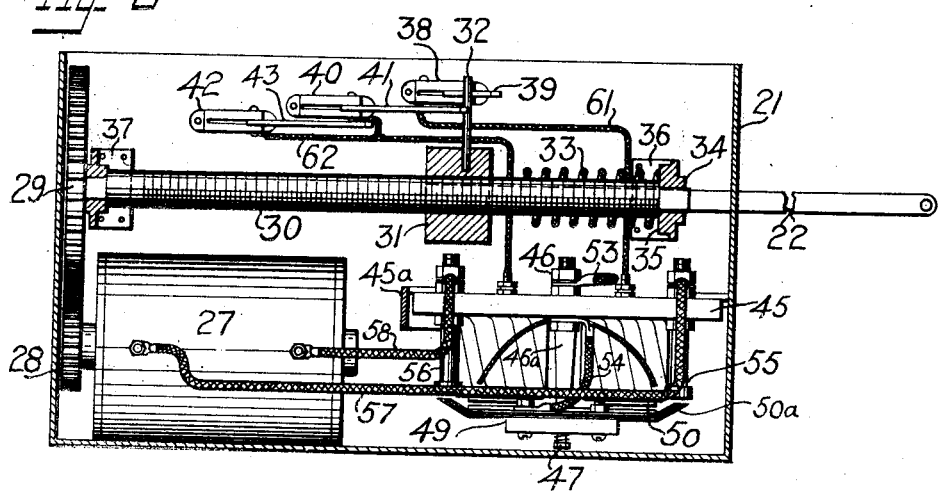
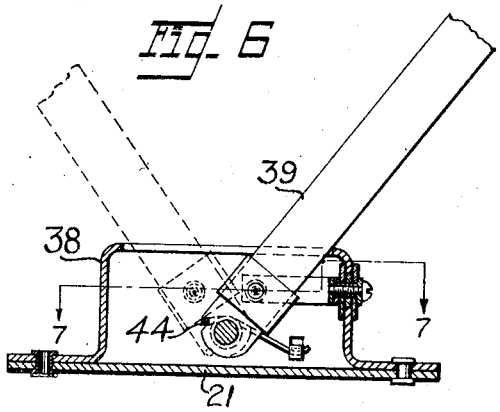
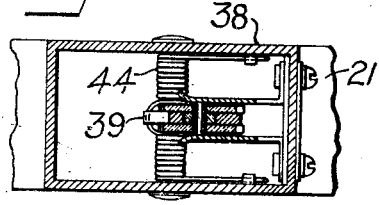
INVENTOR
Andrew C. Williams
BY Samuel H. Davis
ATTORNEY Jan. 31, 1933.  A. C. WILLIAMS  1,896,035
ELECTRIC BRAKE MECHANISM
Filed Feb. 16, 1932    4 Sheets-Sheet 3
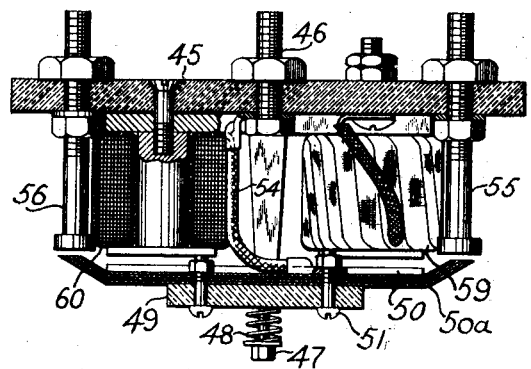
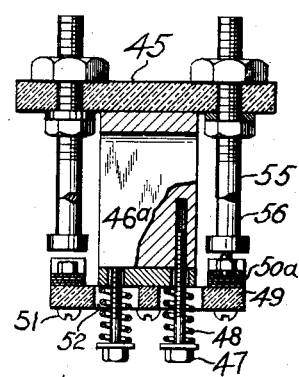
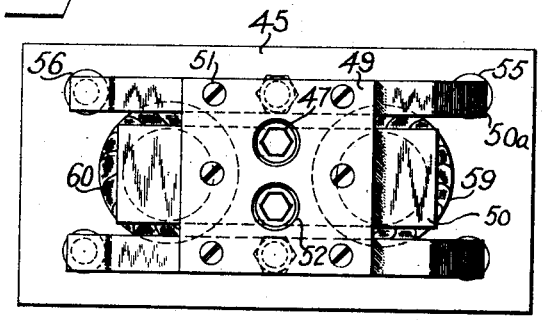
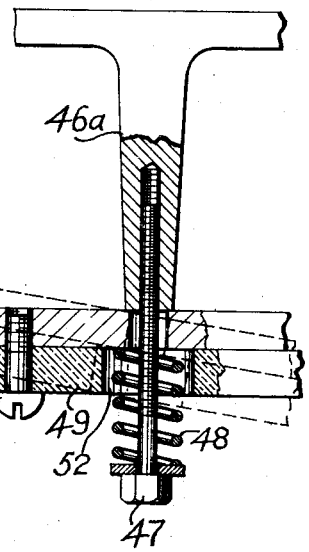
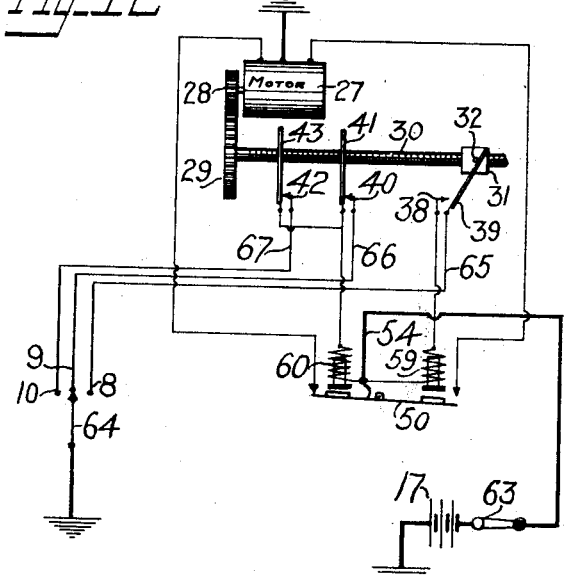
INVENTOR
Andrew C. Williams
BY
Samuel H. Davis
ATTORNEY Jan. 31, 1933.  A. C. WILLIAMS  1,896,035
ELECTRIC BRAKE MECHANISM
Filed Feb. 16, 1932  4 Sheets-Sheet 4

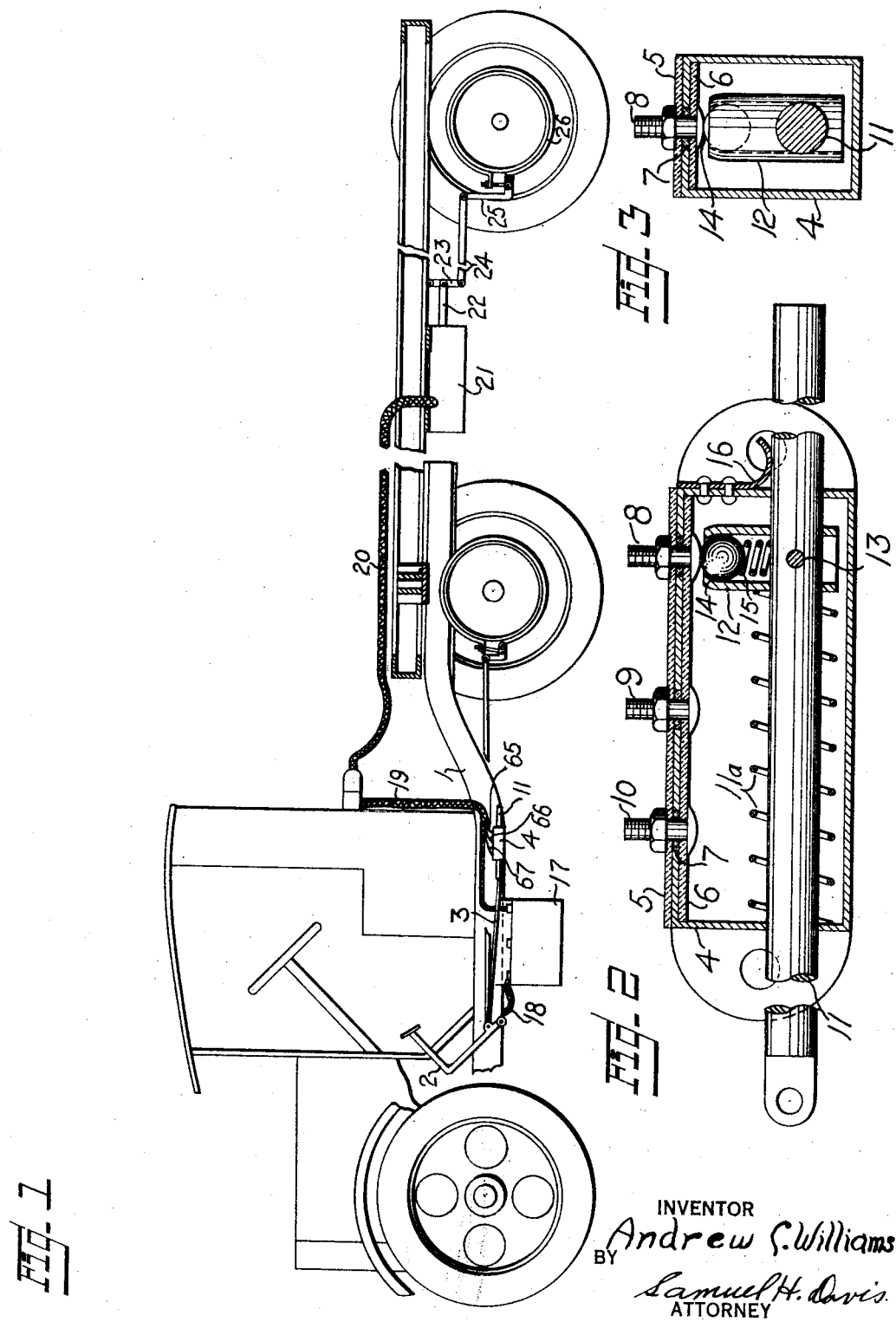

INVENTOR
Andrew C. Williams
BY
Samuel H. Davis
ATTORNEY

Patented Jan. 31, 1933

1,896,035

UNITED STATES PATENT OFFICE

ANDREW C. WILLIAMS, OF LANSING, MICHIGAN, ASSIGNOR OF ONE-HALF TO ALFRED H. DOUGHTY, OF LANSING, MICHIGAN

ELECTRIC BRAKE MECHANISM

Application filed February 16, 1932. Serial No. 593,330.

This invention relates to electric brake mechanism, more particularly, to car or vehicle brakes applied and released by the operation of an electric motor. This invention may be applied to a single truck or other motor wagon, or it may be applied to a truck or motor and also applied to a trailer or train vehicles.

The invention consists in a special arrangement and construction of parts of simple structure and operation, and so disposed as to be readily accessible for adjustment or attention of any character, and believed to be capable of long service practically without attention and without expert knowledge on the part of the operator.

In the accompanying drawings are illustrated the special formation and disposition of the parts of this invention.

Fig. 1 is a side view of a truck with this invention applied thereto.

Fig. 2 is a longitudinal section, somewhat enlarged, of the lever operated switch contacts casing.

Fig. 3 is a vertical section of the casing shown in Fig. 2.

Fig. 4 is a horizontal section of the motor and magnetic switch box disclosing parts therein.

Fig. 5 is a vertical section lengthwise of the motor and magnetic switch box shown in Fig. 4.

Fig. 6 is a section lengthwise through one of the series of switches shown in Figs. 4 and 5.

Fig. 7 is a horizontal section through the switch cover illustrated in Fig. 6.

Fig. 8 is a sectional view lengthwise of the magnetic switch.

Fig. 9 is a vertical cross sectional view of the magnetic switch.

Fig. 10 is a bottom view of the magnetic switch.

Fig. 11 is a fragmentary partly sectional view showing the post for carrying the rocking armature of the magnetic switch.

Fig. 12 is a diagram showing the positions of the switches and setting out the conductors when the lever operated switch is upon the middle contact thereof.

Throughout the drawings and description the same number is used to refer to the same part.

Figure 13:
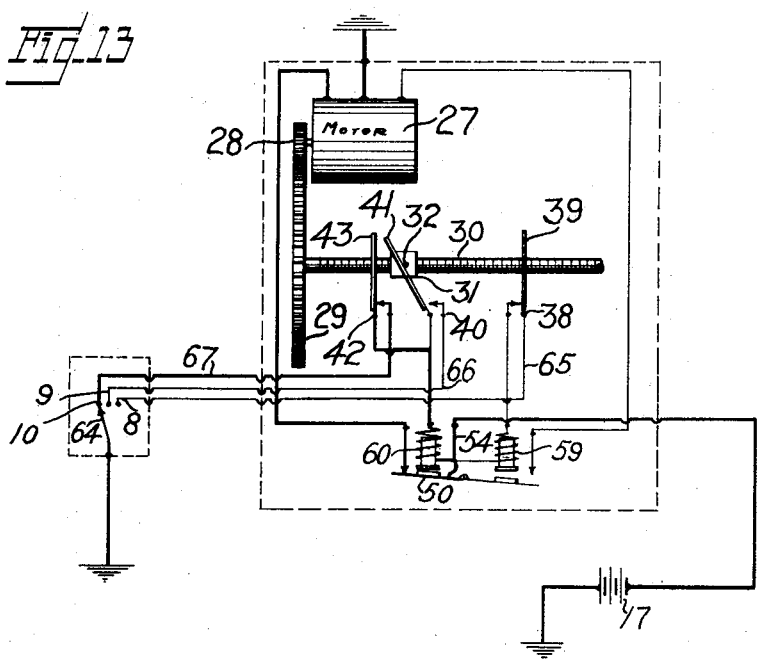
Fig. 13 is a like diagram showing the positions of the switches when the lever operated switch is upon the third or left hand contact.

Considering the drawings, the truck frame 1 bears an operating lever 2 having a connecting rod 3 extending to a switch box 4 carried by the frame 1. The outside wall 5 and the inside wall 6 of box 4 are insulating plates, and insulating washers 7 encircle the binding posts 8, 9 and 10 of the switch device. The connecting rod 3 draws in operation upon the switch rod 11 in box 4, and correspondingly moves a holder 12 attached by pin 13 to rod 11. The holder contains ball contact 14 pressed upwardly by spring 15, so that the ball may contact as shown with switch posts 8, 9 and 10 separately. A spring 11a returns the switch rod 11 to the position illustrated in Fig. 2.

As illustrated in Fig. 2 the rod 11 is in rubbing contact with the brush 16, and the box is grounded on frame 1, therefore, each of the contacts 8, 9 and 10 may be grounded individually.

The position of the battery 17 is shown in Fig. 1 with the ground connection 18 therefor. From the battery cables 19 and 20 lead to the motor box 21, from which extends movably the brake connection 22 connected with intermediate lever 23 borne by frame 1, and operating connecting rod 24 and lever 25 of the brake band 26.

Best shown in Figs. 4 and 5 is the reversible motor 27 having small gear 28 reducing the speed of revolution by the large gear 29 of the actuating screw rod 30. The rod is threaded through block 31 from which projects pin 32. Rod 30 is encircled by coil spring 33 and in operation is pressed by block 31 against an end bearing for screw 30 comprising a reduced portion 34 and a part 35 of larger diameter to seat spring 33. The bearings for revoluble rod 30 are carried by cross plates 36 and 37 between the sides of box 21. Within box 21 is a series of switches, on the right hand the switch is marked 38 and its rod is 39. The middle switch 40 has a throw rod 41, and the third switch 42 has a like operating arm 43. Each switch has a coil spring 44 by which it is held yieldingly in engagement with the switch contacts as illustrated in Fig. 7.

Considering Figs. 8, 9, 10 and 11, the construction of the magnetic switch, so termed for the purposes of this description, will be noted. This feature comprises an insulating plate 45, which is provided with a middle binding post 46, and a depending plate or post 46a. Threaded upwardly into the post 46a is a bolt 47, and encircling the bolt is a spiral spring 48. The spring is arranged against a polarized armature 50 and is located with respect to its upper end in a cylindrical cavity in an insulating plate 49 which is secured to the armature by the screws 51, and the cavity is marked 52. This arrangement permits the armature to rock on the spring, which normally holds the armature in a horizontal attitude. It will be understood from Figs. 10 and 11, that the insulating plate 45 is a unitary element, and the downwardly extending plate or post 46a is an integral part of plate 45. Further, the bottom plate 49 is a single piece, and the armature is likewise a unit. The plate 45 is supported in box 21 by the end of the box and by the cross piece or bracket 45a located about midway of the box as set out in Figs. 4 and 5. Bottom plate 49 carries duplicate laminated conducting pieces 50a which make contact when rocked with the twin terminal bolts 55 and 56 which are connected with the motor by the conductors 57 and 58 also shown in Figs. 4 and 5. Current electricity is delivered by the battery 17 and conductor 53 to the intermediate binding post 46 of the magnetic switch, and from the binding post by conductor 54 to one of the laminated contact pieces 50a. It will be noted in Fig. 4 that the twin binding posts 46 are connected by the transverse strap indicated in broken lines, and the second binding post is provided with a conductor like conductor 54 from the post. The magnets of the switch are designated by numbers 59 and 60, and they may be grounded by way of the conductors 61 and 62, shown in Fig. 5 as leading to the series of switches 38, 40 and 42.

Figure 14:
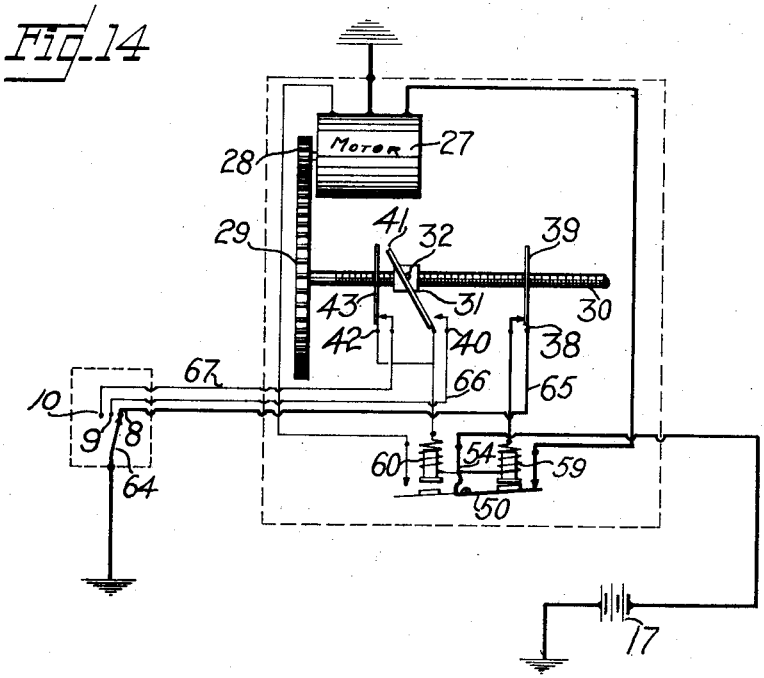
Fig. 14 is a diagram showing the positions of the switches when the lever operated switch is upon the first or right hand contact.

Considering the diagrams Figs. 12, 13 and 14, with respect to the operation of this invention, it will be understood that in Fig. 12 the lever 2 in Fig. 1 has been moved to bring the ball 14, Fig. 2, into contact with the binding post 9, the middle post or contact of the lever operated switch. Assume the battery switch 63 to be closed. This switch is introduced to cut the battery out entirely when the truck is to be housed. Now, current passes through magnet 60 rocking armature 50 and affording a path by way of conductor 58 to the motor and ground.

Although the switch 38—39 of the series is opened by pin 32 when the brake is applied, it is normally held open when the brake is released, in order that current may pass through the motor to hold the brake released. Considering, Fig. 13 the polarized armature is rocked as illustrated and the current is sent in a direction resulting in the reversing of the motor. The block 31 is moved to the left by screw rod 30, and the arm 39 of the switch follows the block under the action of the coil spring 44. The block 31 is moved along the screw rod 30, and acts to cause the operation of each of the switches as described. Switch 38 is thus opened. In the diagram Fig. 12 the pointer 64 is intended to represent the lever operated switch rod 11, and as contact 8 is no longer in touch therewith the switch 38 is not grounded in that direction. As block 31 proceeds to the left its pin 32 moves the middle switch arm 41 and opens the middle switch 40 of the series. In this switch the coil spring 44 resists the opening movement to a certain amount but is overcome by the motor. Opening the middle switch 40 stops the pull on the brake connection 22 to which the block is attached, and the brakes are only applied with partial force. If pressure is taken off the lever 2 no further braking effect results. If, however, the operator still moves the lever 2 until the ball 14 engages the contact 10, Fig. 13, Fig. 2, the paths for the current by way of conductors 65 and 66 are broken, but the circuit is complete through conductor 67. As switch 43 of the series is closed, the armature remains rocked as in diagram 12, the current continues through the motor and the block 31 moves to the left applying the brakes with greater force. To guard against injury, an undue movement of the block to the left by the motor results in opening the switch 43 and interrupting the current. When pressure is removed from the operating lever 2, the spring 11a returns the switch rod 11 to its position illustrated in Fig. 2, with the ball contact in touch with the right hand contact 8 of the switch, Fig. 14, and the current is directed in the opposite direction through the magnets 59 and 60 and through the motor, causing the block 31 to travel to the right hand and the arms 41 and 43 are allowed to follow the pin 32 and close those switches. In its reversal the current rocks the armature 50 into the position illustrated in Fig. 14 as the current flows through the magnets in the opposite direction. The magnets are directly grounded through the switch 38 of the series. The current is now still applied to the motor and the block 31 is moved to the right hand. It meets the spring 33 on rod 30 and the movement of the block is cushioned and stopped. The brake connection is thus held in its release position.

It is not intended to limit this invention to the precise construction and arrangement or to the particular shapes or sizes of the parts, and those elements may be changed in a variety of ways.

Having now described this invention and the mode of its operation I claim:—

1. In an electric brake mechanism, a switch having a plurality of contacts, an operating lever and means actuated thereby for grounding said contacts individually, a reversible motor, a magnetic switch, conductors connecting said contacts and magnetic switch whereby said motor may be driven alternately in two directions, a source of electric current, a brake connection, means actuated by the motor for moving said brake connection in two directions alternately, switches separately operated by the said actuating means whereby the motor may be driven to apply or to release said connection, and means for cushioning said connection in its released position.

2. In an electric brake mechanism, a switch having a plurality of contacts, an operating lever and means actuated thereby for grounding said contacts individually, a reversible motor, a magnetic switch, conductors connecting said contacts and magnetic switch whereby said motor may be driven alternately in two directions, a source of electric current, a brake connection, a block attached to said brake connection and movable in two directions, means actuated by the motor for moving the block, switches arranged in the path of the block and operated thereby for controlling the application and release of said connection by the operation of the motor, and means to cushion said connection in its released position.

3. In an electric brake mechanism, a switch having a plurality of contacts, an operating lever and means actuated thereby for grounding said contacts individually, a reversible motor, a magnetic switch, conductors connecting said contacts and magnetic switch whereby the motor may be driven alternately in two directions, a source of electric current, a brake connection, means actuated by the motor for moving said brake connection alternately in two directions, a spring arranged to act upon said brake connection to cushion said connection in its released position, and a series of switches separately operated by said actuating means for controlling the operation and direction of rotation of the motor.

4. In an electric brake mechanism, a switch having a plurality of contacts, an operating lever and means moved thereby for grounding said contacts individually, a reversible motor, a magnetic switch, conductors connecting said contacts and the magnetic switch whereby said motor may be driven alternately in opposite directions, a source of electric current, a brake connection, a block movable in two directions, means operated by the motor for moving the block, the said brake connection being moved by the said block, a spring arranged in the path of the block and disposed to act upon said brake connection and to cushion the same in its released position, and a series of switches arranged in the path of said block and separately operated thereby to control the operation and direction of rotation of the motor.

5. In electric brake mechanism, a switch having a plurality of contacts, an operating lever and means moved thereby for grounding said contacts individually, a reversible motor, a magnetic switch, conductors connecting said contacts and magnetic switch whereby said motor may be driven alternately in opposite directions, a source of electric current, a brake connection, a block movable alternately in two directions and attached to said brake connection, an actuating screw rod rotated by the motor and threaded through said block, a spring on said rod to cushion said brake connection in its release position, and a series of switches in the path of said block and separately moved thereby to complete the circuit controlling the operation and direction of rotation of the motor.

6. In electric brake mechanism, a switch having a plurality of contacts, an operating lever and means moved thereby for grounding said contacts individually, a reversible motor, a magnetic switch, conductors connecting said contacts and magnetic switch whereby said motor may be driven alternately in opposite directions, a source of electric current, a brake connection, means actuated by the motor for moving said brake connection in two directions alternately, a series of switches separately operated by the said actuating means for completing the motor circuits, means to cushion said brake connection in its release position, and one of said series of switches being contructed and arranged to interrupt the motor circuit during the brake applying movement of said connection.

In testimony whereof, I affix my signature.

ANDREW C. WILLIAMS.